3 Sheets--Sheet 1.

E. E. BEAN.

Wax Thread Sewing-Machines.

No. 5,965. Reissued July 14, 1874.

Witnesses:
George E. Phelps.
Charles G. Haines.

Inventor:
Edwin E. Bean,
by Alban Andrew, atty.

3 Sheets--Sheet 2.

E. E. BEAN.

Wax Thread Sewing-Machines.

No. 5,965. Reissued July 14, 1874.

Witnesses:

George E. Phelps.
Charles G. Haines.

Inventor:

Edwin E. Bean
by Alban Andrews atty

3 Sheets--Sheet 3

E. E. BEAN.

Wax Thread Sewing-Machines.

No. 5,965. Reissued July 14, 1874.

Witnesses:

George E. Phelps
Charles G. Haines.

Inventor:

Edwin E. Bean,
by Alban Andrén, atty

UNITED STATES PATENT OFFICE.

EDWIN E. BEAN, OF BOSTON, MASSACHUSETTS.

IMPROVEMENT IN WAX-THREAD SEWING-MACHINES.

Specification forming part of Letters Patent No. 134,508, dated January 7, 1873; reissue No. 5,965, dated July 14, 1874; application filed January 30, 1874.

*To all whom it may c[illegible]n:*

Be it known that I, EDWIN E. BEAN, of Boston, in the county of Suffolk and State of Massachusetts, have invented certain new and useful Improvements in Wax-Thread Sewing-Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to improvements in wax-thread sewing-machines, consisting in the employment of one single arm or crank for the operation of the awl-bar, thread-guide, and presser-foot; also, in the employment of one rocker-shaft for the operation of the awl above the work-supporting plate, and one rocker-shaft for the operation of the needle below the work-supporting plate, in combination with a rotary driving-shaft located between the above-named rocker-shafts, these shafts being connected by intermediate connecting devices, and operating substantially as described.

Figure 1:
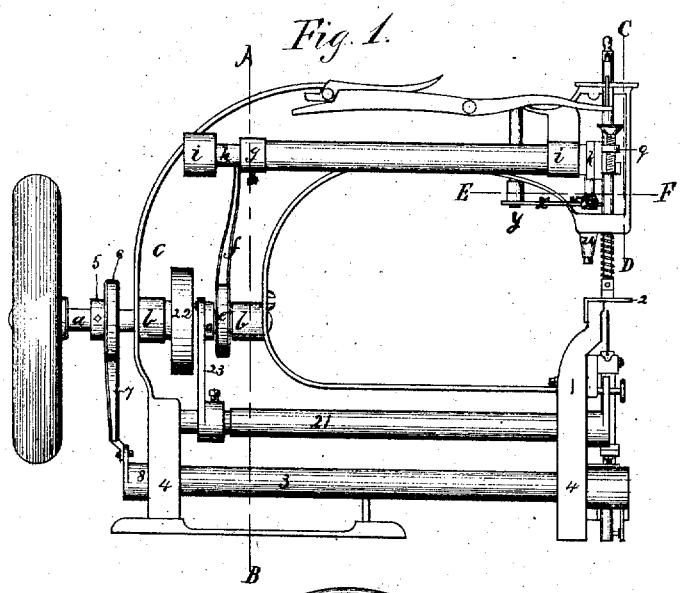
Figure 3:
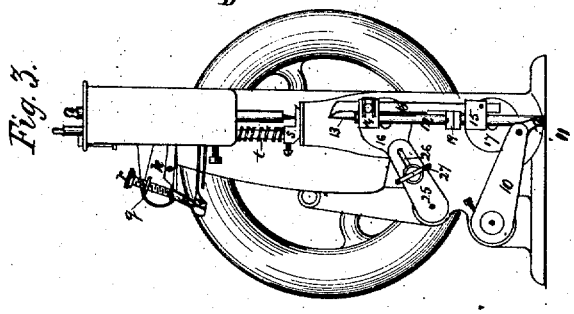
Figure 2:
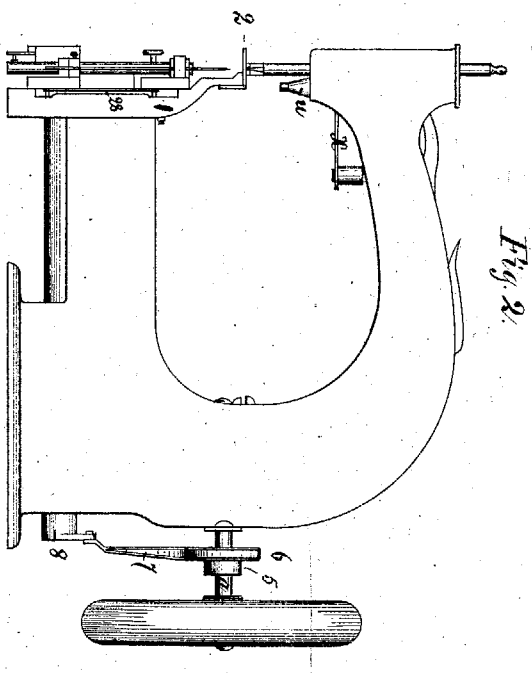
Figure 4:
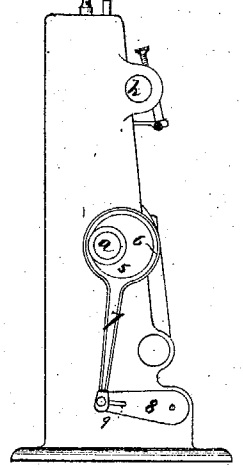
Figure 5:
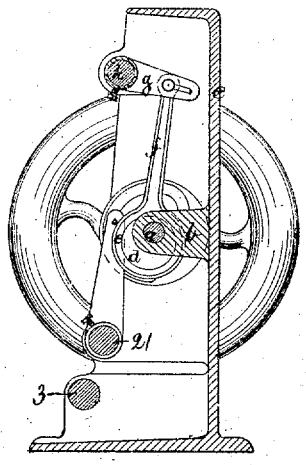
Figure 6:
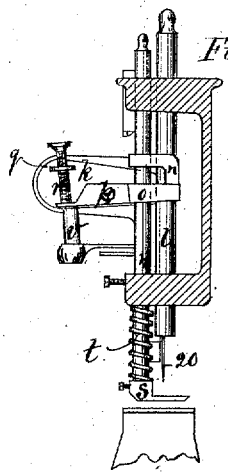
Figure 7:
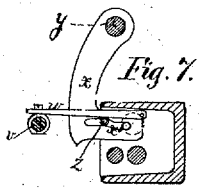

On the drawings, Figure 1 represents a side elevation. Fig. 2 represents also a side elevation, seen from the opposite side of Fig. 1. Fig. 3 is a front view. Fig. 4 is a rear view. Fig. 5 is a cross-section on the line A B, shown in Fig. 1. Fig. 6 is an enlarged cross-section on the line C D, shown in Fig. 1; and Fig. 7 is an enlarged cross section on the line E F, also shown in Fig. 1.

Similar letters refer to similar parts wherever they occur on the different parts of the drawing.

*a* is the driving-shaft, movable in bearings *b b*, attached to the frame *c*. To the shaft *a* is keyed, or otherwise secured, an eccentric disk, *d*, surrounded by the ring *e*, that forms a part of the connecting-rod *f*, as shown. The upper end of the connecting-rod *f* is connected to an arm, *g*, secured to the rock-shaft *h*, movable in bearings *i i*, attached to the frame *c*. By this arrangement a rocking motion is imparted to the shaft *h*. To the rock-shaft *h* is attached an arm, *k*, the outer end of which is jointed directly to the awl-bar *l*, by which arrangement a positive vertical throw is given to the said awl-bar. The presser-foot bar *m* is also operated by the arm *k* in the following manner: To the presser-foot bar *m* is secured a projecting knee, *n*, that is lifted upward by means of the lever *o*, which is jointed to the arm *k* by means of the pin or screw *p*, as shown in Fig. 6. On the side of the arm *k* is attached a small bracket, *q*, tapped for the reception of a regulating-screw, *r*, the lower end of which rests on a projecting part of the lever *o*, and by the turning of which the lift of the presser-foot bar *m* is easily regulated. The presser-foot *s* is held in contact with the material operated upon by means of the coiled spring *t*, surrounding the presser-foot bar *m*, in the manner shown in Fig. 6. The thread-guide bar *u* is also operated from the arm *k* as follows: From the under side of the said arm *k* projects an arm, *v*, the lower end of which is jointed to a connecting-link, *w*, the extreme end of which is jointed to a knee-lever, *x*, made to move around the fulcrum or pin *y*, attached to the frame *c*, as shown in Figs. 1 and 7. On the upper end of the thread-guide bar *u* is secured a crank-pin, *z*, that is guided in a groove, *x'*, made in the knee-lever *x*, as shown. As the arm *k* is rocked around its axis, so is also the arm *v*, that imparts the rocking motion to the link *w* and lever *x*, whereby the crank-pin *z* is operated by the curved groove *x'*, and by this means the thread-guide bar *u* is made to swing partially around its axis, thus imparting the necessary motion to the thread-guide. 1 represents the post, surmounted in its upper end with a suitable work-supporting plate, 2, as shown in Figs. 1, 2, and 3. Below the rotary shaft *a*, as well as below the work-supporting plate 2, is located a rock-shaft, 3, made to rock in suitable bearings 4 4, secured to or made in one piece with the frame *c*. The rock-shaft 3 is operated from the driving shaft *a* by means of an eccentric disk, 5, secured to and made adjustable on the aforesaid shaft *a* by means of a set-screw. The eccentric disk 5 is surrounded by a ring, 6, projecting downward, as an arm, 7, that is jointed at its lower end to a lever, 8, secured to the rocking shaft 3. The lever 8 is provided with a slot, 9, by which and a set-screw or pin projecting through the end of the connecting-rod 7 the throw of the needle is easily adjusted. To the front end of the rocking shaft 3 is secured an adjustable crank or lever, 10, to the end of which is jointed a connecting-rod, 11, that connects the lower end of the needle-bar 12 to the said lever 10. The needle 13 is secured in the upper end of the needle-bar 12 in the usual manner. The needle-bar 12 works up and down in guides 14 15, that are hinged to bearing-plates 16 17, that are made to rock around pins going through their centers and secured to the post 1. The cast-off bar 18 is also made to slide up and down in the guides 14 15, and is operated by means of one or more adjustable collars, 19, on the needle-bar 12, engaging in a slot on the aforesaid cast-off bar 18.

From the above it will be readily understood that by means of the rotary driving shaft *a* and its intervening mechanism a rocking motion is imparted to the shaft 3, by which and the lever 10 and connecting-rod 11 the needle-bar 12 is operated up and down through the material resting on the work-supporting plate 2, the needle going through a perforation previously made in the material by the awl 20, secured to the lower end of the awl-bar *l*. This kind of machines relates to that class employing a needle-feed—that is, the material is fed by means of a lateral motion given to the needle in addition to its up-and-down motion. To accomplish this lateral motion of the needle I employ an additional rocking shaft, 21, resting in suitable bearings in the frame *c*. The shaft 21 is rocked by means of a cam-wheel, 22, made adjustable by means of a set-screw. The cam-wheel 22 is secured to the driving-shaft *a* and rotates with the same. A lever, 23, is made adjustable on and secured to the rocking shaft 21, and is provided in its upper end with a pin or roller that engages in a cam-groove, 24, made on the face of the cam-wheel 22. On the forward end of the rocking shaft 21 is secured a slotted arm or lever, 25, provided with a slot, 26, as shown in Fig. 3. The upper bearing-plates 16 for the needle-bar is connected to the rocking arm 25 by means of an adjustable pin, bolt, or thumb-screw, 27, that projects through the slot 26 and a similar slot made in a projection on the aforesaid bearing-plate 16.

By this lateral arrangement it will easily be seen that an oscillating motion is given to the bearing-plate 16 by means of the lever 25, rock-shaft 21, lever 23, and cam-wheel 22. As the bearing-plate 16 rocks around its center it imparts a lateral motion to the needle, by which the material operated upon is fed forward on the work-supporting table. The amount of feed required can easily be regulated by altering the position of the thumb-screw 27 in the slot 26 on the arm 25. I prefer to move both bearing-plates 16 and 17 together, for which purpose I connect them together by means of a suitable link or connecting-rod, 28, Fig. 2, whereby an exact horizontal motion is given to the needle, the advantage thereof being that a very small perforation is made in the material operated upon.

Having thus fully described the nature, construction, and operation of my invention, I wish to secure by Letters Patent, and claim—

1. In combination, the arm *k*, projection *n*, lever *o*, regulating-screw *r*, and presser-foot bar *m*, constructed and arranged as and for the purpose herein shown and described.

2. In combination, the arm *k*, projection *v*, link *w*, slotted knee-lever *x*, crank-pin *z*, and thread-guide bar *u*, constructed and arranged as herein fully set forth and described.

3. The needle and awl bars, operating in line and from opposite sides of the work-plate, in combination with the rotary driving-shaft *a* and awl and needle-bars operating rock-shafts, when connected by intermediate connecting devices, and operating substantially as described.

4. The presser-foot in combination, with the lever *o*, rocking arm *k*, and spring *t*, for imparting movements to the presser-foot, as described.

In testimony that I claim the foregoing I have hereunto set my hand this 12th day of January, 1874.

EDWIN E. BEAN.

Witnesses:

ALBAN ANDRÉN.

GEORGE E. PHELPS.